United States Patent
Oda et al.

(10) Patent No.: US 8,399,071 B2
(45) Date of Patent: Mar. 19, 2013

(54) PROCESS FOR PRODUCING POLYCRYSTALLINE SILICON

(75) Inventors: Hiroyuki Oda, Shunan (JP); Takuya Asano, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 105 days.

(21) Appl. No.: 13/142,359

(22) PCT Filed: Feb. 3, 2010

(86) PCT No.: PCT/JP2010/051475
§ 371 (c)(1),
(2), (4) Date: Jun. 27, 2011

(87) PCT Pub. No.: WO2010/090203
PCT Pub. Date: Aug. 12, 2010

(65) Prior Publication Data
US 2011/0268892 A1 Nov. 3, 2011

(30) Foreign Application Priority Data
Feb. 4, 2009 (JP) .................................. 2009-023409

(51) Int. Cl.
*C23C 14/26* (2006.01)
(52) U.S. Cl. .......................... 427/585; 427/587; 427/593
(58) Field of Classification Search .................. 427/585, 427/587, 593
See application file for complete search history.

(56) References Cited

U.S. PATENT DOCUMENTS

| | | | |
|---|---|---|---|
| 4,165,363 A | 8/1979 | Weigert et al. | |
| 4,217,334 A | 8/1980 | Weigert et al. | |
| 5,211,802 A * | 5/1993 | Kaneko et al. | 117/51 |
| 5,310,531 A * | 5/1994 | Ikeda et al. | 423/324 |
| 5,478,396 A * | 12/1995 | Keck et al. | 118/719 |
| 6,503,563 B1 * | 1/2003 | Yatsurugi et al. | 427/255.27 |
| 6,932,954 B2 | 8/2005 | Wakamatsu et al. | |
| 7,939,173 B2 * | 5/2011 | Sofin et al. | 428/446 |
| 2008/0069755 A1 * | 3/2008 | Hongu et al. | 423/348 |
| 2009/0269493 A1 * | 10/2009 | Mizuno et al. | 427/255.18 |
| 2012/0100302 A1 * | 4/2012 | Fabry et al. | 427/534 |

FOREIGN PATENT DOCUMENTS

| | | |
|---|---|---|
| JP | 54-38524 B2 | 8/1982 |
| JP | 57-140309 A | 8/1982 |
| JP | 60-81010 A | 5/1985 |
| JP | 10-316413 A | 12/1998 |
| JP | 2004-2138 A | 1/2004 |
| JP | 2004-149324 A | 5/2004 |
| JP | 2005-112662 A | 4/2005 |

OTHER PUBLICATIONS

Hashim, Uda, et al., "High Purity Polycrystalline Silicon Growth and Characterization". Chiang Mai J. Sci. 2007; 34(1): 47-53.*

(Continued)

*Primary Examiner* — Bret Chen
(74) *Attorney, Agent, or Firm* — Birch, Stewart, Kolasch & Birch, LLP

(57) ABSTRACT

The process for producing polycrystalline silicon by feeding a reaction gas containing a silane gas and a hydrogen gas into a reaction vessel equipped with silicon core members erected on the electrodes, heating the silicon core members by flowing an electric current thereto to a temperature at which silicon deposits, forming polycrystalline silicon rods by allowing the formed silicon to deposit on the silicon core members, and discharging the discharge gas after the reaction from the reaction vessel, wherein the discharge gas discharged from the reaction vessel is quenched so that the temperature thereof drops from 800° C. down to 500° C. in not longer than 0.1 second.

1 Claim, 1 Drawing Sheet

OTHER PUBLICATIONS

Del Coso, G., et al., "Chemical Vapor Deposition Model of Polysilicon in a Trichlorosilane and Hydrogen System". Journal of the Electrochemcial Society, 155 (6) D485-D491 (2008).*

International Search Report, PCT/JP2010/051476, Apr. 13, 2010.

* cited by examiner

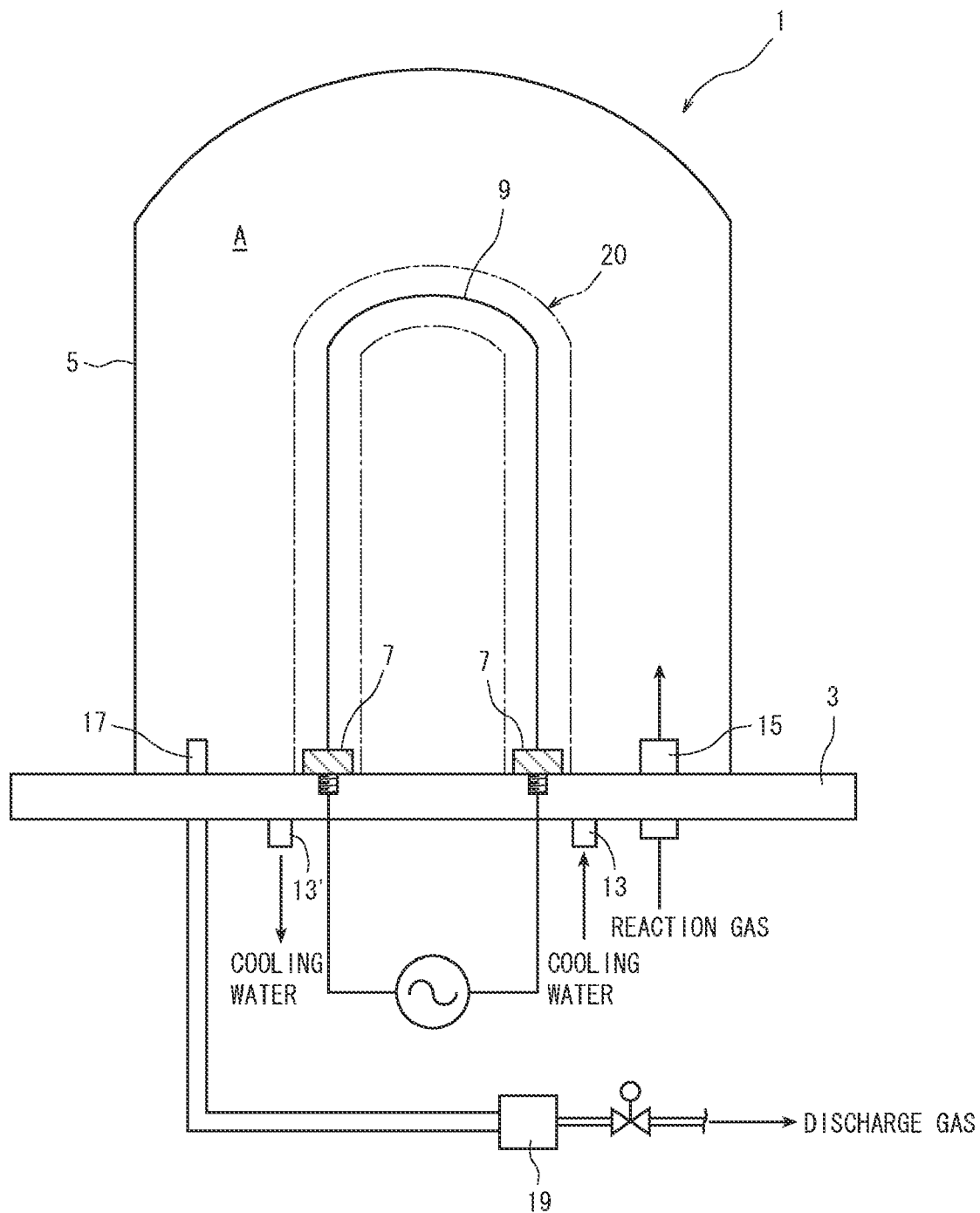

PROCESS FOR PRODUCING POLYCRYSTALLINE SILICON

TECHNICAL FIELD

This invention relates to a process for producing polycrystalline silicon in the form of rods by depositing polycrystalline silicon on silicon core members arranged being erected in a reaction vessel relying on the chemical vapor-phase deposition method.

BACKGROUND ART

A variety of processes have heretofore been known for producing silicon that is used as a starting material of semiconductors or wafers for solar power generation, and some of them have already been put into practice on industrial scales. For instance, one of them is a process called Siemens process in which silicon core members arranged in a reaction vessel are heated by flowing an electric current thereto to a temperature at which silicon deposits, a gas of a silane compound such as trichlorosilane ($SiHCl_3$) and a hydrogen gas are fed therein so that silicon is formed by the reducing reaction, and the formed silicon is deposited on the silicon core members. This process has a feature in that polycrystalline silicon of a high purity is obtained in the form of rods, and has been put into practice as the most general process (see patent documents 1, 2).

There has, further, been proposed a process for preventing the dichlorosilane in the discharge gas from being converted into the tetrachlorosilane by quenching the discharge gas from a bell jar from 1000° C. down to not higher than 800° C. in not longer than 0.2 seconds (see patent document 3).

PRIOR ART DOCUMENTS

Patent Documents

Patent document 1: JP-A-2004-149324
Patent document 2: JP-A-2005-112662
Patent document 3: JP-A-57-140309

OUTLINE OF THE INVENTION

Problems that the Invention is to Solve

Here, the reaction vessel used for putting the above process into practice comprises a bottom plate on which the electrodes are mounted and a bell jar made of a stainless steel attached onto the bottom plate, and has a structure in which silicon core members are erected on the electrodes on the bottom plate. By using the reaction vessel of the above structure, by heating the silicon core members by feeding the electric current through the electrodes and, at the same time, by feeding a silane gas and a hydrogen gas as a reaction gas into the reaction vessel, the polycrystalline silicon deposits on the silicon core wires to form polycrystalline silicon rods while the discharge gas containing unreacted gas and by-products is discharged from the reaction vessel undergoing the above reaction.

When the polycrystalline silicon rods are produced as described above, however, the gas discharged from the reaction vessel contains unreacted silane compounds, hydrogen and by-produced hydrogen chloride as well as phosphine ($PH_3$) that is formed as phosphorus contained as impurity in the carbon electrodes is released therefrom. Here, a phosphorus-silicon compound stemming from the phosphine infiltrates into the silane compound separated from the discharge gas. If the silane compound separated from the discharge gas is reused as the starting material, therefore, there occurs a problem in that the phosphorus component gradually builds up in the reaction vessel and deposits on the obtained polycrystalline silicon rods causing the purity thereof to decrease. Therefore, it has been desired to improve the above problem.

For example, even if the discharge gas was quenched and the residence time in a temperature region of 1000° C. to 800° C. was set to be not longer than 0.2 seconds as proposed in the patent document 3, the problem of phosphorus component build-up could not be prevented.

It is, therefore, an object of the present invention to provide a process for producing polycrystalline silicon, which is capable of effectively removing the phosphorus component from the discharge gas discharged from the reaction vessel, and makes it possible to reuse a silane compound contained in the discharge gas.

Means for Solving the Problems

According to the present invention, there is provided a process for producing polycrystalline silicon by feeding a reaction gas containing a silane gas and a hydrogen gas into a reaction vessel equipped with silicon core members erected on the electrodes, heating the silicon core members by flowing an electric current thereto to a temperature at which silicon deposits, forming polycrystalline silicon rods by allowing the formed silicon to deposit on the silicon core members, and discharging the discharge gas after the reaction from the reaction vessel, wherein the discharge gas discharged from the reaction vessel is quenched so that the temperature thereof drops from 800° C. down to 500° C. in not longer than 0.1 second.

Effects of the Invention

According to the present invention, the discharge gas discharged from the reaction vessel is quenched from a temperature of 800° C. down to 500° C. in not longer than 0.1 second. Therefore, the silane compound contained in the discharge gas can be easily separated from the phosphorus component by chilling or the like method, and can be reused.

The principle is estimated to be as described below.

That is, the interior of the reaction vessel is maintained at a temperature of not lower than 800° C. so that silicon is formed and is deposited on the silicon core members. At such a high temperature, phosphorus contained as impurity in the carbon heater and carbon electrodes in the reaction vessel undergoes the reaction with hydrogen in the reaction vessel maintained at a high temperature to form phosphine. At temperatures of not lower than 800° C., further, decomposed products ($SiCl_2$, SiHCl, etc.) of chlorosilane remain stable due to thermodynamic equilibrium and do not almost react with phosphine.

If the temperature of the discharge gas becomes not higher than 800° C., however, the decomposed products no longer remain stable and react with $H_2$ or HCL and turn into trichlorosilane or dichlorosilane. Here, if phosphine is present in the atmosphere, then the phosphine reacts with the trichlorosilane or the dichlorosilane to form phosphorus-silicon compounds such as silylphosphine [$Si(PH_2)Cl_3$] and the like. Thus, it will be learned that if the discharge gas from the reaction vessel is maintained at a temperature of 500 to 800° C., the phosphorus-silicon compounds such as sylylphosphine [$Si(PH_2)Cl_3$] and the like are formed.

Here, though the phosphine itself can be easily separated from the silane compound by chilling or the like method, it is very difficult to separate the phosphorus-silicon compounds such as silylphosphine and the like from the silane compounds (e.g., trichlorosilane, etc.). Therefore, the phosphorus-silicon compounds infiltrate into the silane compounds separated from the discharge gas and gradually build up in the reaction vessel as the silane compounds circulate in the reaction vessel.

According to the present invention, however, the discharge gas is quenched and is maintained in a temperature range of 800° C. to 500° C. for a period of time of as very short as not longer than 0.1 second. This, therefore, effectively suppresses the formation of phosphorus-silicon compounds that can be difficultly separated from the silane compounds such as silylphosphine and the like, and the silane compounds contained in the discharge gas can be easily separated from the discharge gas and can be reused. It is, therefore, estimated that even if the discharge gas circulates into the reaction vessel, such an inconvenience is effectively prevented in that the phosphorus component builds up in the reaction vessel to deteriorate the quality of the polycrystalline silicon rods that are obtained.

BRIEF DESCRIPTION OF THE DRAWING

FIG. 1 is a side sectional view schematically illustrating the structure of an apparatus for producing silicon used in the invention.

MODE FOR CARRYING OUT THE INVENTION

Referring to FIG. 1, a reaction vessel for producing silicon used in the present invention is generally designated at 1, and is provided with a reaction chamber A formed by covering a bottom plate 3 made of SUS or the like with a bell jar 5. The bell jar 5 is attached to the bottom plate 3 by using bolts so as to be opened and closed. The bottom plate 3 is, further, provided with electrodes 7 on which silicon core wires 9 of an inverse U-shape are erected being connected thereto, and an electric current can be supplied to the silicon core wires 9 via the electrodes 7.

The electrodes are made from carbon, SUS or Cu, and it is desired that the carbon is coated with SiC or the like to prevent impurities contained therein from volatilizing in the reaction vessel.

Though only one silicon core wire 9 is shown, it should be noted that the silicon core wires 9 are, usually, provided in a plural number depending upon the volume of the reaction chamber A (bell jar 5), and are erected on the electrodes 7 being connected thereto so that an electric current can be flown to the silicon core wires 9.

Further, the bottom plate 3 has cooling pipes 13, 13' inserted therein. Upon circulating a cooling medium such as water or the like through the cooling pipes, the bottom plate 3 is cooled.

Since the temperature becomes high in the reaction chamber A, the bell jar 5 is formed by using a stainless steel which has good heat resistance, is light in weight and does not adversely affect the reaction enabling the cooling to be easily conducted. The outer surface of the bell jar 5 is covered with a cooling jacket (not shown).

A gas feed pipe 15 and a gas discharge pipe 17 are inserted in the thus formed reaction chamber A via the bottom plate 3, and predetermined reaction gases are fed into the reaction chamber A through the gas feed pipe 15 while the unreacted gas and a gas of a by-produced compound are discharged from the reaction chamber A. Further, a cooler 19 is attached to the gas discharge pipe 17 so as to immediately quench the discharge gas discharged from the reaction chamber A.

Polycrystalline silicon rods are produced as described below by using the above-mentioned reaction vessel 1 for producing silicon.

An electric current is fed to the silicon core wires 9 through the electrodes 7, and the temperature of the silicon core wires 9 is elevated to be higher than a temperature at which silicon deposits by flowing the electric current. The silicon deposits at a temperature of not lower than about 800° C. In order for the silicon to be quickly deposited on the silicon core wires 9, however, the silicon core wires 9 are heated by flowing the electric current so as to be maintained at a temperature of, usually, about 1000 to about 1100° C.

Simultaneously with the start of flowing electric current to the silicon core wires 9 or at a moment when the temperature of the silicon core wires 9 is elevated to be higher than a temperature at which the silicon deposits, a silane gas and a hydrogen gas are fed as a reaction gas from the gas feed pipe 15, and the silicon is formed by the reaction of these reaction gases (reducing reaction of the silane) and, at the same time, a discharge gas containing unreacted gas is discharged from the reaction chamber A through the gas discharge pipe 17. As the silane gas, there can be used a gas of a silane compound such as monosilane, trichlorosilane, tetrachlorosilane, monochlorosilane or dichlorosilane, or a mixed gas thereof. Usually, the trichlorosilane gas is preferably used. When, for example, the trichlorosilane gas and the hydrogen gas are used, the reducing reaction for forming the silicon is expressed by the following formula,

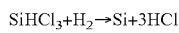

$$SiHCl_3 + H_2 \rightarrow Si + 3HCl$$

Here, due to side reactions, the dichlorosilane, monochlorosilane or monosilane is formed from part of the trichlorosilane.

As the reaction gas, a hydrogen gas is, usually, used in excess amounts.

Further, silicon is formed not only by the above reducing reaction but also by the thermal decomposition of the trichlorosilane as follows:

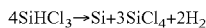

$$4SiHCl_3 \rightarrow Si + 3SiCl_4 + 2H_2$$

Silicon (Si) formed by the above reaction deposits on the silicon core wires 9. By continuing the reaction, silicon grows on the silicon core wires 9 and, finally, silicon rods 20 comprising the polycrystalline silicon are obtained.

The reaction is discontinued at a step when the silicon rods 20 of a predetermined thickness are obtained as described above, and the electric current is no longer supplied to the silicon core wires 9. The unreacted silane gas, hydrogen gas, by-produced silicon tetrachloride and hydrogen chloride remaining in the reaction chamber A are discharged and, thereafter, the bell jar 5 is opened to take out the silicon rods 20.

Here, it is desired that the gas feed pipe 15 and the gas discharge pipe 17 are so arranged that the reaction gases fed into the reaction chamber A form a stable flow, come in contact with the silicon rods, and are discharged as the discharge gas. For this purpose, an embodiment can be employed in which a plurality of gas feed pipes 15 are arranged along the circumferential portion of the bottom plate 3 in the reaction chamber A, and the gas discharge tube 17 is arranged at the central portion of the bottom plate 3. Contrary to the above, further, it is also allowable to provide the gas feed pipe 15 at the central portion of the bottom plate 3 and arrange a plurality of gas discharge pipes 17 along the circumferential portion thereof. In these cases, the ends of the gas feed pipes 15 (gas feed ports) and the ends of the discharge pipes 17 (discharge gas introduction ports) are better arranged near the bottom plate 3.

In the present invention, the discharge gas containing the unreacted silane gas, hydrogen gas, by-produced hydrogen chloride gas and other by-products, is discharged from the reaction chamber A through the gas discharge pipe 17. Immediately after discharged from the reaction chamber A, however, the discharge gas is quenched through the cooler 19 attached to the gas discharge pipe 17 and its temperature is lowered from at least 800° C. down to 500° C. in a short period of time of not longer than 0.1 second. That is, the discharge gas contains phosphine ($PH_3$) stemming from phosphorus contained as impurity in the electrodes 7 of carbon. If the phosphine is made present together with the decomposed products of chlorosilane in a temperature region of 500 to 800° C., then the two react with each other to form a silylphosphine which cannot be easily separated from the silane compound. According to the present invention, however, the time in which the discharge gas stays in the above temperature region is as very short as not longer than 0.1 second making it possible to effectively prevent the formation silylphosphine and the like.

Here, lowering the temperature from 800° C. down to 500° C. in a short period of time of not longer than 0.1 second is a very quick quenching. If it is attempted to do this by using the cooler 19 of ordinary specifications, such as the one of the shell-and-tube type, the cooler becomes very bulky driving up the cost of the apparatus to a striking degree. According to the present invention, therefore, it is desired to use the cooler 19 of the type which is provided with a plurality of spray nozzles and executes the quenching by spraying the tetrachlorosilane of a liquid form from the nozzles. It is, further, desired to arrange the cooler 19 at a position separated away from the reaction vessel 1 and execute the quenching at a moment when the temperature of the discharge gas is lowered down to near 800° C. This is because if the cooler 19 is arranged at a position close to the reaction vessel 1, the quenching is conducted in a state where the temperature of the discharge gas is high. To shorten the residence time to be not longer than 0.1 second in the temperature region of 800 to 500° C., therefore, it becomes necessary to use the cooler 19 of a very large size and to use the refrigerant in very large amounts making it difficult to carry out the process on an industrial scale.

The degree of quenching can be confirmed by monitoring the flow rate of the gas discharged from the gas discharge pipe 17 and the temperatures of the discharge gas before and after the cooler 19 by using temperature sensors.

The discharge gas discharged from the gas discharge pipe 17 as described above contains no P—Si compound such as silylphosphine that cannot be easily separated from the silane compound. Therefore, the silane compound and phosphine as well as by-products such as silicon polymers are separated from each other by chilling or the like and, besides, the hydrogen chloride gas is trapped in the adsorption tower, and the remaining hydrogen gas is recovered or is circulated again into the reaction chamber A. Further, the separated silane compound is recovered, suitably passed through the refining step, and is reused such as being circulated again into the reaction chamber A. Particularly, the present invention is industrially very useful since the trichlorosilane and the like of a high purity without containing P component (silylphosphine) can be recovered by distillation. Moreover, the polycrystalline silicon rods of a high purity can be obtained suppressing the P component therein to a very small degree.

EXAMPLES

Excellent effects of the invention will be described below by way of Examples.

Example 1

There was provided a reaction vessel having a structure shown in FIG. 1 and having the following specifications.
Volume of the reaction chamber A: 2 $m^3$
Bottom plate: Stainless steel
Bell jar wall: Stainless steel
Silicon core wires: 10 Wires (5 pairs of an inverse U-shape, erected on, and connected to, the electrodes attached to the bottom plate).
Cooler: Of the type having 5 spray nozzles in the pipe and spraying the liquid tetrachlorosilane as a refrigerant.

An electric current was fed to the silicon core wires in the apparatus so as to be heated to a temperature of about 1000° C. and, at the same time, the trichlorosilane gas and the hydrogen gas were fed at a mol ratio of 1:4 into the reaction vessel so that the polycrystalline silicon was deposited until the diameter thereof was 120 mm.

The cooler was attached to the gas discharge pipe at a position where the temperature of the discharge gas was 800° C., and the discharge gas was discharged from the reaction chamber A. Upon monitoring the temperatures of the discharge gas before and after the cooler, it was confirmed that the temperature of the discharge gas was lowered from 800° C. down to 500° C. in 0.07 seconds.

Further, the silane compound recovered by chilling the discharge gas was refined by distillation to learn that there was quite no phosphorus in the refined silane (trichlorosilane) After the chilling, further, hydrogen from which hydrogen chloride was removed by adsorption was analyzed to confirm that there was contained quite no phosphorus; i.e., phosphorus had been removed by adsorption.

Here, absence of phosphorus in the refined silane (trichlorosilane) was confirmed by passing the refined silane through a CVD reaction tube of quartz so that Si was deposited therein and making sure that no P was present in the Si. Since no phosphorus was present, it was learned that the silylphosphine had not been formed at all.

Example 2

Deposition was conducted under the same conditions as in Example 1 but carrying out the reaction by using a cooler having 4 nozzles, and the degree of quenching the discharge gas was so adjusted that the temperature of the discharge gas was decreased from 800° C. down to 500° C. in 0.09 seconds while monitoring the temperatures of the discharge gas before and after the cooler.

The silane compound recovered by chilling the discharge gas was distilled and was refined to find that quite no phosphorus was present in the refined silanes. Further, analysis of hydrogen obtained by removing the hydrogen chloride by adsorption after chilling proved that phosphorus was not quite present but had been removed by adsorption.

Comparative Example 1

Deposition was conducted under the same conditions as in Example 1 but using a cooler of the type having one spray nozzle in the pipe. Here, the temperature of the discharge gas after the cooler was 680° C. from which it was calculated that the residence time of the discharge gas from 800° C. down to 500° C. was not shorter than 2 seconds.

The silane compound recovered by chilling the discharge gas was distilled and the obtained trichlorosilane was refined by the CVD of quartz to find that phosphorus was present in the refined silanes in an amount of 60 ppba calculated as silylphosphine.

Comparative Example 2

Deposition was conducted under the same conditions as in Example 1 but using a cooler of the type having 4 spray nozzles in the pipe and having a capacity twice as large as that used in Example 1. Here, the temperature of the discharge gas after the cooler was 500° C., and the residence time of the discharge gas from 800° C. down to 500° C. was 0.2 seconds.

The silane compound recovered by chilling the discharge gas was distilled and was refined to find that phosphorus was present in the refined silanes in an amount of 15 ppba calculated as silylphosphine.

Comparative Example 3

Deposition was conducted under the same conditions as in Example 1 but using a cooler of the type having 4 spray nozzles in the pipe and having a capacity 5 times as large as that used in Example 1. Here, the temperature of the discharge gas after the cooler was 500° C., and the residence time of the discharge gas from 800° C. down to 500° C. was 0.5 seconds.

The silane compound recovered by chilling the discharge gas was distilled and was refined to find that phosphorus was present in the refined silanes in an amount of 21 ppba calculated as silylphosphine.

Comparative Example 4

Deposition was conducted under the same conditions as in Example 1 but using a heat exchanger with water as the refrigerant. Here, the temperature of the heat exchanger on the outlet side thereof was 500° C., and the residence time of the discharge gas from 800° C. down to 500° C. was 0.5 seconds.

The silane compound recovered by chilling the discharge gas was distilled and was refined to find that phosphorus was present in the refined silanes in an amount of 20 ppba calculated as silylphosphine. Presence of phosphine was also confirmed.

DESCRIPTION OF REFERENCE NUMERALS

3: bottom plate
5: bell jar
7: electrodes
9: silicon core wires
17: gas discharge pipe
19: cooler
20: silicon rods

The invention claimed is:

1. A process for producing polycrystalline silicon including following steps of;
   feeding a reaction gas into a reaction vessel equipped with a silicon core member erected on an electrode, said reaction gas containing a silane gas and a hydrogen gas;
   heating the silicon core member by flowing an electric current thereto to a temperature at which silicon deposits;
   forming a polycrystalline silicon rod by allowing the formed silicon to deposit on the silicon core member; and
   discharging a discharge gas after a reaction from the reaction vessel;
   wherein the discharge gas discharged from the reaction vessel is quenched so that the temperature thereof drops from 800° C. down to 500° C. in not longer than 0.1 second.

* * * * *